(12) United States Patent
Sugata et al.

(10) Patent No.: US 11,614,568 B2
(45) Date of Patent: Mar. 28, 2023

(54) LAMINATE, ANTI-REFLECTION STRUCTURE AND CAMERA MODULE MOUNTING APPARATUS

(71) Applicant: Dexerials Corporation, Shinagawa-ku Tokyo (JP)

(72) Inventors: Hiroshi Sugata, Tagajo (JP); Shunichi Kajiya, Tagajo (JP)

(73) Assignee: Dexerials Corporation, Tokyo (JP)

( * ) Notice: Subject to any disclaimer, the term of this patent is extended or adjusted under 35 U.S.C. 154(b) by 0 days.

(21) Appl. No.: 16/760,907

(22) PCT Filed: Oct. 26, 2018

(86) PCT No.: PCT/JP2018/039990
§ 371 (c)(1),
(2) Date: May 1, 2020

(87) PCT Pub. No.: WO2019/093164
PCT Pub. Date: May 16, 2019

(65) Prior Publication Data
US 2021/0132257 A1    May 6, 2021

(30) Foreign Application Priority Data

Nov. 7, 2017  (JP) .............................. JP2017-214809

(51) Int. Cl.
*G02B 1/118* (2015.01)
*G02F 1/1335* (2006.01)
(52) U.S. Cl.
CPC ........ *G02B 1/118* (2013.01); *G02F 1/133502* (2013.01); *G02F 1/133512* (2013.01)
(58) Field of Classification Search
CPC ..... G02B 1/118; G02B 1/11; G02F 1/133502; G02F 1/133512; B32B 7/023; B32B 2307/408; C09D 5/006
See application file for complete search history.

(56) References Cited

U.S. PATENT DOCUMENTS

| | | | |
|---|---|---|---|
| 2008/0057228 A1 | 3/2008 | Horie et al. | |
| 2011/0123777 A1* | 5/2011 | Imaoku | G02B 1/118 428/172 |
| 2017/0293051 A1* | 10/2017 | Kawasaki | G02B 5/003 |
| 2018/0100957 A1* | 4/2018 | Ye | G02B 5/0294 |
| 2018/0246256 A1* | 8/2018 | Abe | G02B 1/11 |

FOREIGN PATENT DOCUMENTS

| | | |
|---|---|---|
| CN | 101194187 A | 6/2008 |
| CN | 104118994 A | 10/2014 |

(Continued)

OTHER PUBLICATIONS

Nov. 27, 2018, International Search Report issued in the International Patent Application No. PCT/JP2018/039990.

(Continued)

*Primary Examiner* — Nancy R Johnson
(74) *Attorney, Agent, or Firm* — Kenja IP Law PC

(57) ABSTRACT

Provided is a laminate and an anti-reflection structure that can be thinned, are excellent in anti-reflection performance and can keep reflection chromaticity neutral.
In the laminate according to the present disclosure, a part of a light shielding film has a non-light shielding portion without a light shielding film; an anti-reflection structure is formed in the non-light shielding portion through an adhesion layer, and a fine uneven structure has an uneven period that is equal to or less than a wavelength of visible light; and a color difference (ΔE) between a reflected light by the light shielding film and a reflected light by the anti-reflection structure expressed in the formula shown below is equal to or less than 1.5.

$$\Delta E = \sqrt{(a_1-a_2)^2 + (b_1-b_2)^2}$$

5 Claims, 6 Drawing Sheets

(56) References Cited

FOREIGN PATENT DOCUMENTS

| | | |
|---|---|---|
| JP | 2006243409 A | 9/2006 |
| JP | 2012030597 A | 2/2012 |
| JP | 2012252224 A | 12/2012 |
| JP | 2014071292 A | 4/2014 |
| JP | 2014098864 A | 5/2014 |
| JP | 2015054402 A | 3/2015 |
| JP | 2015231725 A | 12/2015 |
| JP | 2016112804 A | 6/2016 |
| JP | 2017143478 A | 8/2017 |
| JP | 2017146467 A | 8/2017 |
| NO | 2015030237 A1 | 3/2015 |

OTHER PUBLICATIONS

Sep. 14, 2021, Notification of Reasons for Refusal issued by the Japan Patent Office in the corresponding Japanese Patent Application No. 2017-214809.

May 7, 2020, International Preliminary Report on Patentability issued in the International Patent Application No. PCT/JP2018/039990.

Jun. 25, 2021, Office Action issued by the China National Intellectual Property Administration in the corresponding Chinese Patent Application No. 201880071894.X.

Jul. 14, 2021, the Extended European Search Report issued by the European Patent Office in the corresponding European Patent Application No. 18877179.4.

Database WPI Week 201458 Thomson Scientific, London, GB; An 2014-K33298, XP002803368, 2014.

Feb. 25, 2022, Office Action issued by the Taiwan Intellectual Property Office in the corresponding Taiwanese Patent Application No. 107138833.

Jan. 31, 2023, Notification of Reasons for Refusal issued by the Japan Patent Office in the corresponding Japanese Patent Application No. 2022-020861.

* cited by examiner

LAMINATE, ANTI-REFLECTION STRUCTURE AND CAMERA MODULE MOUNTING APPARATUS

TECHNICAL FIELD

The present disclosure relates to a laminate, an anti-reflection structure and a camera module mounting apparatus that can be thinned, are excellent in anti-reflection performance and can keep reflection chromaticity neutral.

BACKGROUND

A display device such as a liquid crystal display or an optical device such as a camera is often subjected to anti-reflection treatment such as formation of an anti-reflection film on an incident surface of light on a base material such as a display plate or a lens in order to avoid deterioration of visibility and image quality (generation of color unevenness, ghost, or the like) due to reflection of light from the outside.

Here, as one of existing anti-reflection treatments, a technique of forming a fine uneven structure on a light incident surface so as to reduce reflectance is known.

For example, Patent Literature (PTL) 1 discloses a solid-state image sensor configured to construct an image through photoelectric conversion of light incident on a semiconductor substrate, in which a fine uneven structure is formed on a light incident surface of a semiconductor substrate and an anti-reflection film having a predetermined thickness is formed on the fine uneven structure so as to reduce generation of reflection of light on the light incident surface.

CITATION LIST

Patent Literature

PLT 1: JP2015054402A

SUMMARY

Technical Problem

When the above described anti-reflection film treatment technique is considered to be applied to a field of small electronic devices and the like, thinning (e. g. 15 μm or less) is required. However, in the technique disclosed in PTL 1, in order to form a fine uneven structure without causing any problems, a total thickness of an outermost layer and a middle layer should be equal to or greater than 25 μm, and there was a room for improvement in terms of thinning.

Moreover, when a multilayer-film anti-reflection structure as disclosed in PTL 1 is used, coloration may occur in the reflected light, and a difference in reflection color may occur as compared with the peripheral portion, thus the sense of unity of color is impaired.

Thus, in consideration of application to a cover film provided on a front surface of a sensor or to a cover film provided on a front surface of a camera module sensor, development of an anti-reflection treatment technique that causes no difference in the reflection color between the surface to which the anti-reflection treatment technique is applied and its surrounding surface (hereinafter referred to as "the reflection chromaticity is kept neutral").

The present disclosure has been made in light of the circumstances set forth above, and an object thereof is to provide a laminate and an anti-reflection structure that are thinned, are excellent in anti-reflection performance and can keep reflection chromaticity neutral. Another object of the present disclosure is to provide a camera module mounting apparatus capable of being thinned by using the above described laminate and obtaining a captured image with reduced color unevenness.

Solution to Problem

As a result of intensive research to solve the above described problem, the inventors of the present disclosure have found that a high anti-reflection performance can be realized while reducing the thickness by forming an anti-reflection structure having a fine uneven structure on the surface thereof through an adhesion layer and by setting an uneven period of the fine uneven structure to be equal to or less than the wavelength of visible light, and in addition, a reflection chromaticity can be kept neutral between the surface subjected to the anti-reflection treatment technique and its surrounding surface by setting a difference in color between the reflected light by the light shielding film and the reflected light by the anti-reflection structure to be small (specifically, equal to or less than 1.5).

The present disclosure is made on the basis of the above described findings, and the scope thereof is as follows:

(1) A laminate including a display plate, a light shielding film provided on the display plate and an anti-reflection structure having a fine uneven structure on a surface thereof, wherein a part of the light shielding film has a non-light shielding portion without a light shielding film;

the anti-reflection structure is formed in the non-light shielding portion through an adhesion layer, and the fine uneven structure has an uneven period equal to or less than the wavelength of visible light; and a color difference (ΔE) between reflected light by the light shielding film and reflected light by the anti-reflection structure expressed in the formula shown below is equal to or less than 1.5.

$$\Delta E = \sqrt{(a_1-a_2)^2+(b_1-b_2)^2} \qquad \text{[Mathematical formula 1]}$$

(where $a_1$ and $b_1$ represent a* and b* values of the light reflected by the light shielding film in the CIE1976 (L*a*b*) color system, and $a_2$ and $b_2$ represent a* and b* values of the light reflected by the anti-reflection structure in the CIE1976 (L*a*b*) color system.)

The above described configuration allows for thinning, an excellent anti-reflection performance and a reflection chromaticity kept in neutral.

(2) The laminate according to (1), wherein a total thickness of the anti-reflection structure and the adhesion layer is equal to or less than 30 μm.

(3) The laminate according to (1) or (2), wherein the adhesion layer is a layer made of an ultraviolet curing adhesive.

(4) The laminate according to any one of claims (1) to (3), wherein an average uneven height of the fine uneven structure is equal to or greater than 190 nm.

(5) The laminate according to any one of (1) to (4), wherein a difference (ΔY) between a luminous reflectance of the light shielding film (hereinafter referred to also as "Y value") and a luminous reflectance of the anti-reflection structure (Y value) is equal to or less than 0.5.

(6) An anti-reflection structure formed on a display plate through an adhesion layer and having a fine uneven structure on a surface thereof, wherein the fine uneven structure has an uneven period equal to or less than a wavelength of visible light;

a total thickness of the anti-reflection structure and the adhesion layer is equal to or less than 30 µm; and an average uneven height of the fine uneven structure is equal to or greater than 190 nm.

The above described configuration allows for thinning, an excellent anti-reflection performance and a reflection chromaticity kept in neutral.

(7) A camera module mounting apparatus including a laminate described in any one of (1) to (5) and a camera module provided at a position facing an anti-reflection structure in the laminate.

According to the above described configuration, thinning is achieved and a captured image in which color unevenness is reduced can be obtained.

Advantageous Effect

According to the present disclosure, a laminate and an anti-reflection structure that can be thinned, are excellent in anti-reflection performance and can keep reflection chromaticity neutral can be provided. Further, according to the present disclosure, a camera module mounting apparatus in which thinning is achieved by using the laminate and a captured image with reduced color unevenness can be provided.

DETAILED DESCRIPTION

Hereinafter an embodiment of the present disclosure will be illustrated specifically with reference to drawings as necessary. Each member disclosed in FIGS. 1 to 3 may be schematically represented by a scale or a shape different from the actual ones for convenience of explanation.

<Laminate>

First, an embodiment of a laminate according to the present disclosure will be explained.

Figure 1:
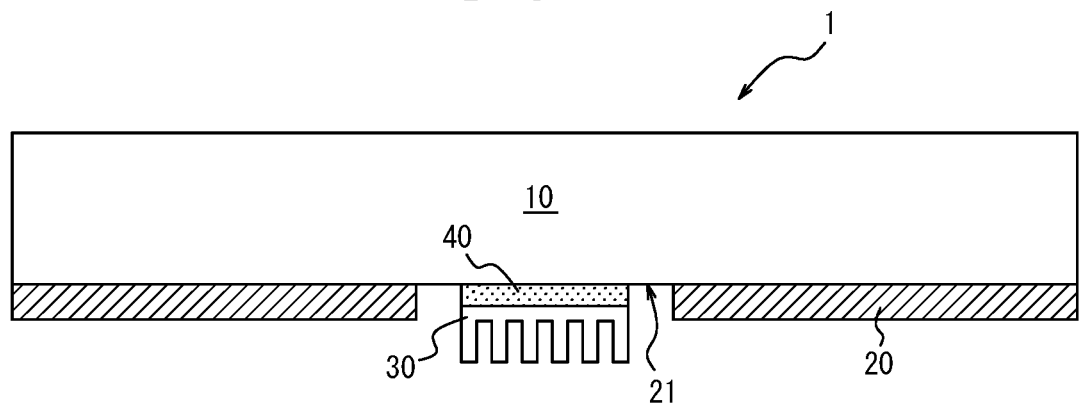
FIG. 1 is a cross-sectional view schematically illustrating an embodiment of a laminate according to the present disclosure.

The laminate according to the present disclosure is a laminate 1 including a display plate 10, a light shielding film 20 provided on the display plate 10 and an anti-reflection structure 30 having a fine uneven structure on a surface thereof, as illustrated in FIG. 1.

In the laminate 1 according to the present disclosure, a part of the light shielding film 20 has a non-light shielding portion 21 without the light shielding film 20, the anti-reflection structure 30 is formed in the non-light shielding portion 21 through an adhesion layer 40, the fine uneven structure 30 has an uneven period P equal to or less than the wavelength of visible light (see FIG. 2), and a color difference (4E) between the reflected light by the light shielding film and the reflected light by the anti-reflection structure expressed in a formula shown below is equal to or less than 1.5.

$$\Delta E = \sqrt{(a_1-a_2)^2+(b_1-b_2)^2}$$ [Mathematical formula 2]

(where $a_1$ and $b_1$ represent a* and b* values of the light reflected by the light shielding film in the CIE1976 (L*a*b*) color system, and $a_2$ and $b_2$ represent a* and b* values of the light reflected by the anti-reflection structure in the CIE1976 (L*a*b*) color system.)

A high anti-reflection performance can be realized while thinning is achieved by forming an anti-reflection structure 30 having a fine uneven structure on the surface thereof through the adhesion layer 40 and setting an uneven period P of the fine uneven structure 30 to be equal to or less than the wavelength of the visible light. Moreover, when a color difference ΔE between the reflected light by the light shielding film 20 and the reflected light by the anti-reflection structure 30 is small such as equal to or less than 1.5, the reflection chromaticity can be kept neutral between the surface treated with the anti-reflection treatment technique (the surface of the anti-reflection structure 30 in FIG. 1) and its surrounding surface (the surface of the light shielding film 20 in FIG. 1).

(Display Plate)

As illustrated in FIG. 1, the laminate 1 according to the present disclosure includes the display plate 10.

The display plate 10 is a member serving as a substrate or a support plate of the laminate 1 according to the present disclosure. Materials of the display plate 10 are not particularly limited, and may be appropriately selected according to the purpose of use of the laminate.

For example, the material of the display plate may be glass, polymethyl methacrylate (PMMA) or the above described materials whose surface is coated with an organic material (polyimide, etc.), and the like. The display plate may preferably be transparent so as to transmit light, since the display plate is used as a liquid crystal display, a touch panel and the like.

It is to be noted that, "transparent" herein means a transmittance of the light of the wavelength belonging to the visible light band (about 360 nm to 830 nm) is high, and for example, means that a transmittance of the light is equal to or greater than 70%.

Furthermore, the shape of the display plate is not particularly limited except that it has a plate shape, and can be appropriately selected according to the purpose of use of the laminate. Further, the surface on which the light shielding film and the anti-reflection structure are laminated (in FIG. 1, under the display plate 10) may be a flat face, for example, so that they can be easily formed.

(Light Shielding Film)

The laminate 1 according to the present disclosure further includes the light shielding film 20 on the display plate 10 as illustrated in FIG. 1.

The light shielding film 20 enhances the light-shielding effect, and blocks the light from reaching a solid-state image sensor even if a thinned display plate 10 transmits the light (in particular the light with a wavelength of equal to or greater than 800 nm).

A material constituting the light shielding film is not particularly limited, and a known light shielding film can be appropriately used depending on the use.

As a material of the light shielding film, for example, a composition for a light shielding film in which a binder resin contains light-shielding particles, a filler, other additives and the like can be used.

Examples of the binder resin include, for example, (meth) acrylic resin, urethane resin, polyvinyl alcohol, polyvinyl butyral, polyvinyl formal, polyamide, polyester, and the like, and include (meth) acrylic resin, urethane resin, and the like. These resins may have a carboxylic acid group, a sulfonate group, a phonic acid group, a phonic acid group, a sulfonamide group, and the like, as an acid group, Examples of the light-shielding particles include, for example, inorganic pigment such as carbon black, titanium black, tungsten compound, zinc oxide, lead white, lithopon, titanium oxide, chromium oxide, iron oxide, precipitated barium sulfate and barite powder, red lead, red iron oxide, yellow lead, zinc yellow (zinc yellow type 1 and zinc yellow type 2), ultramarine blue, procyanide blue (potassium ferrocyanide), zircon gray, praseodymium yellow, chrome titanium yellow, chrome green, peacock, victorial green, iron blue (unrelated to Prussian blue), vanadium zirconium blue, chrome tin pink, manganese pink, salmon pink and the like. Further, as the black pigment, a metal oxide, a metal nitrogen, a mixture thereof, or the like containing one or more metal elements selected from the group consisting of Co, Cr, Cu, Mn, Ru, Fe, Ni, Sn, Ti, and Ag can be used.

Furthermore, the light-shielding particles may also include light-shielding dyes such as, for example, cyanine dyes, phthalocyanine dyes, naphthalocyanine dyes, immonium dyes, aminium dyes, quinolium dyes, pyrylium dyes, or metal complex dyes such as Ni complex dyes.

The content of the light-shielding particles in the light-shielding film composition is not particularly limited, but is preferably from 30 to 70 mass %, more preferably from 40 to 60 mass %, and still more preferably from 45 to 55 mass %, based on the total solid content.

Further, the composition for a light shielding film may contain fillers and other additives as necessary. The filler is not particularly limited as long as it increases the reflectance, and for example, an organic filler, an inorganic filler, or an inorganic-organic composite filler can be used.

Examples of the organic filler include, for example, synthetic resin particles, natural polymer particles, and the like, and preferably resin particles such as acrylic resin, polyethylene, polypropylene, polyethylene oxide, polypropylene oxide, polyethyleneimine, polystyrene, polyurethane, polyurea, polyester, polyamide, polyimide, carboxymethylcellulose, gelatin, starch, chitin, chitosan, and the like.

Examples of the inorganic filler include metals and metal compounds such as silica, mica compound, glass, zinc oxide, alumina, zircon oxide, tin oxide, potassium titanate, strontium titanate, aluminum borate, magnesium oxide, magnesium borate, aluminum hydroxide, magnesium hydroxide, calcium hydroxide, titanium hydroxide, basic magnesium sulfate, calcium carbonate, magnesium carbonate, calcium sulfate, magnesium sulfate, calcium silicate, magnesium silicate, calcium phosphate, silicon nitride, titanium nitride, aluminum nitride, silicon carbide, titanium carbide, zinc sulfide, and at least two or more of these compounds.

Examples of the above described other additives include known additives such as a polymerizable compound, a polymerization initiator, a dispersant, a sensitizer, a cross-linking agent effect accelerator, and a surfactant.

Although the average thickness of the light shielding film 20 is not particularly limited, it is preferably equal to or less than 30 μm, and more preferably equal to or less than 10 μm in terms of thinning of the laminate 1. Moreover, the thickness of the light shielding film 20 is preferably equal to or greater than 3 μm in terms of maintaining a high light-shielding effect.

It is to be noted that the average thickness of the light shielding film 20 is obtained by taking the average of the portion where the light shielding film 20 is formed, excepting the thickness of the non-light shielding portion 21 described later. For example, it can be obtained by taking the average of thicknesses of any five portions of the light shielding film 20, for example.

Further, in the laminate 1 according to the present disclosure, as illustrated in FIG. 1, a part of the light shielding film 20 is constituted of a non-light shielding portion 21 where no light shielding film 20 is formed. This is because, when the anti-reflection structure 30 described later is provided in the non-light shielding portion 21, thinning of the laminate 1 is promoted and an anti-reflection action can be sufficiently exhibited as well.

It is to be noted that the non-light shielding portion 21 is a portion of the light shielding film 20 where no light shielding film is formed. The above described non-light shielding portion 21 may be a through hole as illustrated in FIG. 1 or a partially transparent material may be filled therein.

The size of the non-light shielding portion 21 is not particularly limited, and may be changed according to the size of the anti-reflection structure 30.

However, it is preferable that the portion where the anti-reflection structure 30 is not formed be as small as possible so as to reliably block the light reaching the solid-state image sensor. Specifically, when the light shielding film and the non-light shielding portion 21 are viewed from the front, it is preferable that the anti-reflection structure 30 be formed in a range of preferably 50% and more preferably 100% of the area of the non-light shielding portion 21 (i.e., the opening area of the light shielding film 20).

The method of forming the light shielding film 20 is not particularly limited, and a known forming method can be appropriately used depending on the thickness of the light shielding film 20, the manufacturing facility, and the like.

For example, the light-shielding film 20 can be formed by applying the above described light-shielding film composition to the display plate 10 by spin coating, spray coating, slit coating, inkjet coating, rotation coating, flow casting coating, roll coating, screen printing, or the like, followed by curing treatment such as light irradiation treatment or heat treatment.

(Anti-Reflection Structure)

As illustrated in FIG. 1, the laminate 1 according to the present disclosure has, in the non-light shielding portion 21 thereof, the anti-reflection structure 30 having a fine uneven structure formed on the surface thereof.

The anti-reflection structure 30 can enhance the anti-reflection performance of the laminate 1 by the fine uneven structure formed on the surface thereof.

Figure 2A:
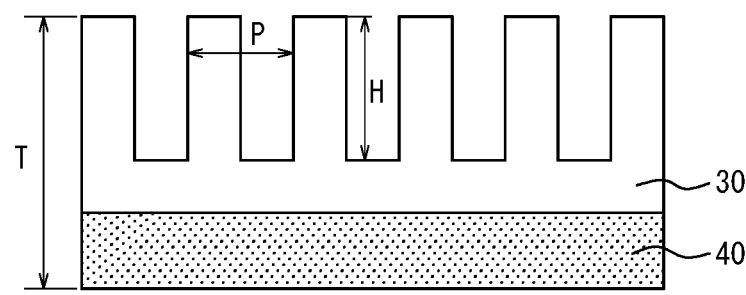
FIG. 2A is a cross-sectional view enlarging and schematically illustrating an embodiment of an anti-reflection structure and an adhesion layer of the laminate according to the present disclosure.

FIG. 2A illustrates an embodiment of the anti-reflection structure 30 and the adhesion layer 40.

Each projection and each recess of the fine uneven structure of the anti-reflection structure 30 may be periodically disposed (e.g., staggered lattice shape, rectangular lattice shape), as illustrated in FIG. 2A, and may also be disposed randomly. Furthermore, the shape of the projection and the recess is not particularly limited, and may be artillery, conical, columnar, or needle shaped and the like. It is to be noted that the shape of the recess means a shape formed by the inner wall of the recess.

The fine uneven structure of the anti-reflection structure 30 has an uneven period (uneven pitch) P that is equal to or less than the wavelength of visible light (e.g. 830 nm or less). Moreover, the upper limit of the uneven period P is preferably equal to or less than 350 nm and more preferably equal to or less than 280 nm, and the lower limit of the uneven period P is preferably equal to or greater than 100 nm, and more preferably equal to or greater than 150 nm.

The uneven period P of the fine uneven structure is set to not more than the visible light wavelength, in other words, the fine uneven structure is formed in what is called a "moth-eye structure," and as a result an excellent anti-reflection performance can be realized.

The uneven period P of the uneven structure is an arithmetic mean value of the distances between adjacent protrusions and adjacent recesses. The uneven period P can be observed, for example, using a scanning electron microscope (SEM) or a cross-section transmission electron microscope (cross-section TEM) and the like.

The method by which the arithmetic mean value between adjacent protrusions and adjacent recesses is calculated may, for example, be a method in which a plurality of combinations of adjacent protrusions and a plurality of combinations of adjacent recesses are selected, the distances between the protrusions and the distances between the recesses in these combinations are measured, and the measured values are averaged.

Further, the average uneven height (the depth of recess) H of the fine uneven structure may preferably be equal to or greater than 190 nm so as to keep the reflection chromaticity neutral in more reliable manner. Further, the average uneven height P of the fine uneven structure may preferably be equal to or less than 320 nm in terms of thinning of the laminate. As illustrated in FIG. 2A, the uneven height H of the fine uneven structure is a distance from the bottom of the recess to the vertex of the protrusion, as illustrated in FIG. 2A, and the average uneven height can be obtained by measuring some uneven heights H (e. g., five portions) and averaging them.

The thickness of the support portion under the fine uneven structure of the anti-reflection structure 30 where the fine uneven structure is not formed (hereinafter referred to as a "base portion" of the anti-reflection structure 30) is not particularly limited, and may be about from 500 nm to 9000 nm.

Figure 2B:
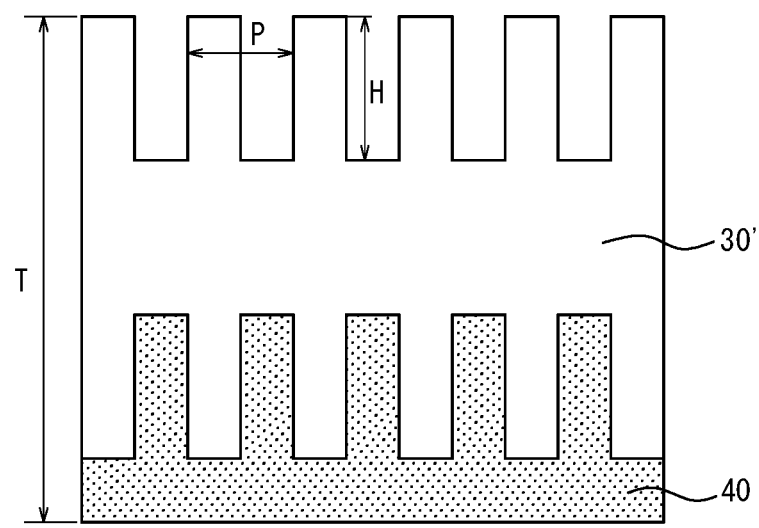
FIG. 2B is a cross-sectional view enlarging and schematically illustrating another embodiment of the anti-reflection structure and the adhesion layer of the laminate according to the present disclosure.

The fine uneven structure of the anti-reflection structure 30 is needed to be provided on the surface on the side that does not come in contact with at least the adhesion layer 40, as illustrated in FIG. 2A. However, as another embodiment, the fine uneven structure can be provided on both sides, as illustrated in FIG. 2B.

The material of the anti-reflection structure 30 is not particularly limited. Examples of the material include, for example, a resin composition that is cured by a curing reaction, such as an active energy ray curable resin composition (photocurable resin composition, electron beam curable resin composition), thermosetting resin composition, or the like, and for example, a resin composition containing a polymerizable compound and a polymerization initiator.

As the polymerizable compound, for example, (i) an esterified product obtained by reacting (meth) acrylic acid or a derivative thereof in a ratio of equal to or greater than 2 mol to 1 mol of polyhydric alcohol, (ii) an esterified product obtained by a polyhydric alcohol, a polyvalent carboxylic acid or an anhydride thereof, an (meth)acrylic acid or a derivative thereof, and the like can be used. Examples of the above described (i) include 1,4-butanediol di(meth)acrylate, 1,6-hexanediol di(meth)acrylate, 1,9-nonanediol di(meth)acrylate, trimethylol propantri(meth)acrylate, trimethylol ethantri(meth)acrylate, pentaerythritol tri(meth)acrylate, pentaerythritol tetra(meth)acrylate, tetrahydrofuryl acrylate, glycerin tri(meth)acrylate, dipentaerythritol penta(meth)acrylate, dipentaerythritol hexa(meth)acrylate, tripentaerythritol hexa(meth)acrylate, tripentaerythritol hepta(meth)acrylate, acryloimonofoline, urethane acrylate, and the like.

Examples of the above described (ii) include polyhydric alcohols such as trimethylolethane, trimethylolpropane, glycerin, and pentaerythritol; polycarboxylic acids or anhydrides thereof selected from malonic acid, succinic acid, adipic acid, glutaric acid, sebacic acid, fumaric acid, itaconic acid, maleic anhydride, and the like; and esterified products obtained by reacting (meth)acrylic acid or derivatives thereof.

These polymerizable compounds may be used alone or two or more types may be used in combination.

Furthermore, when the resin composition is photocurable, examples of photopolymerization initiators include, for example: carbonyl compounds such as benzoin, benzoin methyl ether, benzoin ethyl ether, benzoin isopropyl ether, benzoin isobutyl ether, benzyl, benzophenone, p-methoxybenzophenone, 2,2-diethoxyacetophenone, α, α-dimethoxy-α-phenylacetophenone, methylphen ylglyoxylate, ethylphenylglyoxylate, 4,4'-bis(dimethylamino)benzophenone, 1-hydroxycyclohexyl phenyl ketone, 2-hydroxy-2-methyl-1-phenyl-propan-1-one, and the like; sulfur compounds such as tetramethylthiuram monosulphide, tetramethylthiuram di sulfide, and the like; 2,4,6-trimethylbenzoyl diphenyl-phosphine oxide, benzoyl diethoxyphosphine oxide; and the like. One or more of these can be used.

When the resin composition is electron beam curable, examples of the electron beam polymerization initiator include: thioxanthones such as benzophenone, 4,4-bis(diethylamino)benzophenone, 2,4,6-trimethylbenzophenone, methylorthobenzoylbenzoate, 4-phenylbenzophenone, t-butylanthraquinone, 2-ethylanthraquinone, 2,4-diethylthioxanthone, isopropylthioxanthone, 2,4-dichlorothioxanthone, and the like; acetophenones such as diethoxyacetophenone, 2-hydroxy-2-methyl-1-phenylpro pane-1-one, benzyl dimethyl ketal, 1-hydroxycyclohexyl-phenyl ketone, 2-methyl-2-morpholino(4-thiomethylphenyl)propane-1-one, 2-benzyl-2-dimethylamino-1-(4-morpholinophenyl)-butanone; benzoin ethers such as benzoin methyl ether, benzoin ethyl ether, benzoin isopropyl ether, and benzoin isobutyl ether; acylphosphine oxide such as 2,4,6-trimethylbenzoyldiphenylphosphine oxide, bis(2,6-dimethoxybenzoyl)-2,4, 4-trimethylpentylphosphine oxide, bis(2,4,6-trimethylbenzoyl)-phenylphosphine oxide, and the like; and methylbenzoyl formate, 1,7-bisacridinylheptane, 9-phenylacrydin, and the like. One or more of these can be used.

When the resin composition is thermosetting, examples of thermal polymerization initiators include: organic peroxides such as methyl ethyl ketone peroxide, benzoyl peroxide, dicumyl peroxide, t-butyl hydroperoxide, cumene hydroperoxide, t-butyl peroxyoctoate, t-butyl peroxybenzoate, lauroyl peroxide, and the like; azo-based compounds such as azobisisobutyronitrile; and redox polymerization initiators obtained by combining amines such as N,N-dimethylaniline, N,N-dimethyl-p-toluidine with the above described organic peroxides.

These photopolymerization initiators, electron beam polymerization initiators, and thermal polymerization initiators may be used alone or in combination as desired.

The amount of polymerization initiator is preferably 0.01 to 10 parts by mass with respect to 100 parts by mass of polymerizable compound. In such a range, the curing proceeds sufficiently, the molecular weight of the cured product becomes appropriate, and sufficient strength is obtained, and there is no problem that the cured product is colored due to the residue of the polymerization initiator or the like.

Moreover, the resin composition may contain a non-reactive polymer or an active energy ray sol-gel reactive component, and may contain various additives such as a thickener, a leveling agent, an ultraviolet absorber, a light stabilizer, a thermal stabilizer, a solvent, an inorganic filler, and the like, as necessary.

The method of producing the anti-reflection structure 30 is not particularly limited. For example, as illustrated in FIGS. 3A to 3C, an antireflection structure 30 having a fine uneven structure on the surface thereof can be obtained by performing a clamping/crimping step, a curing step, and a peeling step.

Figure 3A:
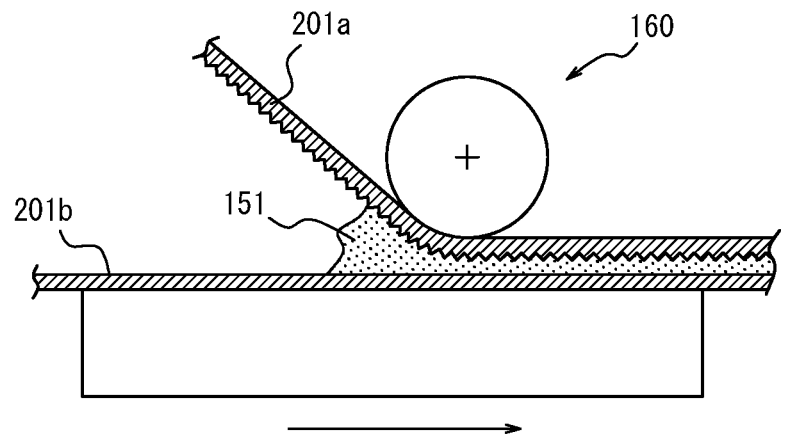
FIG. 3 is a schematic diagram illustrating an example of a production step of producing the anti-reflection structure of the laminate according to the embodiment of the present disclosure.

In the clamping/crimping step, as illustrated in FIG. 3A, a resin composition for anti-reflection structure is clamped and crimped between a holding film having a fine uneven structure on the surface thereof and a holding film having a flat surface.

Specifically, first, a holding film having a fine uneven structure on the surface thereof (a first holding film 201a) and a holding film having a flat surface (a second holding film 201b) are provided. Subsequently, as illustrated in FIG. 3A, a resin composition for anti-reflection structure 151 is clamped between the first holding film 201a and the second holding film 201b. It is to be noted that the holding film 201a having a fine uneven structure on the surface thereof can be produced by forming a fine uneven layer having a predetermined recess-protrusion pattern on a base substrate made of a transparent and hard to break material (e.g., polyethylene terephthalate, triacetyl cellulose, etc.). Thereafter, as illustrated in FIG. 3A, the clamped body is crimped in the clamping direction by a crimping apparatus 160 such as a roll laminator, and the like. Here, in the clamping/crimping step, the thickness of the anti-reflection structure 30 that is obtained finally can be adjusted by adjusting the pressure during crimping.

Figure 3B:
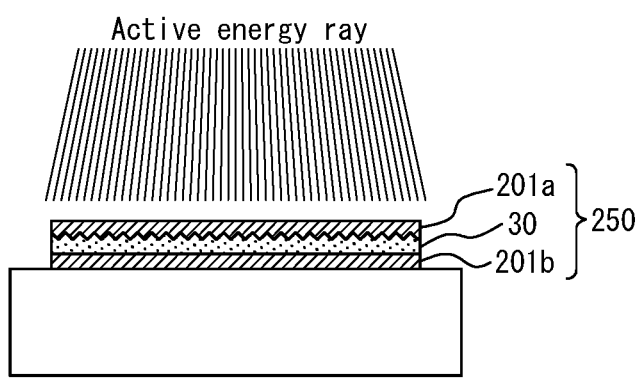
Figure 3C:
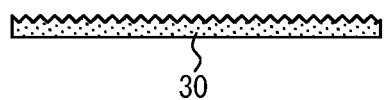

In the above described curing step, as illustrated in FIG. 3B, the clamped resin composition for anti-reflection structure 151 is cured by irradiating with active energy rays such as UV light to form the anti-reflection structure 30 having a fine uneven structure on both sides thereof.

Specifically, as illustrated in FIG. 3B, the clamped resin composition for anti-reflection structure 151 is irradiated with active energy rays to cure the resin composition for anti-reflection structure 151. When the resin composition for anti-reflection structure 151 is cured, a holding film laminate 250 including the anti-reflection structure 30 having a fine uneven structure on the surface thereof is obtained. It is to be noted that the curing step may be performed at the same timing as that of the clamping/crimping step.

In the peeling step, as illustrated in FIG. 3C, the holding films 201a and 201b are peeled from the holding film laminate 250 to obtain the anti-reflection structure 30.

The obtained anti-reflection structure 30 is subjected to a treatment such as cleaning or the like as necessary.

The method of producing the anti-reflection structure 30 is not limited to the above described method of performing a clamping/crimping step, a curing step and a peeling step (FIGS. 3A to 3C), and the anti-reflection structure 30 can be produced by forming a fine uneven structure by sputtering and the like after the resin composition for anti-reflection structure is cured, for example.

(Adhesion Layer)

The laminate 1 according to the present disclosure further includes an adhesion layer 40 configured to bond the anti-reflection structure 30 to the non-light shielding portion 21, as illustrated in FIG. 1.

The adhesion layer 40 is made of an adhesive in order to bond the anti-reflection structure 30 to the non-light shielding portion 21. However, it is necessary to use a material that does not deteriorate the anti-reflection performance of the anti-reflection structure 30.

Specific materials are not particularly limited, and resin compositions which are cured by a curing reaction can be used as appropriate. Among them, the adhesive layer 40 is preferably made of an ultraviolet curable adhesive to obtain a high bonding property. Examples of the ultraviolet curable resin include an ultraviolet curable acrylic resin, an ultraviolet curable epoxy resin, and the like.

The method of forming the adhesion layer 40 is not particularly limited. For example, when the adhesion layer 40 is a layer made of an ultraviolet curable adhesive, the adhesion layer 40 can be formed by irradiating ultraviolet rays to the non-light shielding portion 21 in a state where the ultraviolet curable adhesive is crimped with the anti-reflection structure 30.

It is preferable that the adhesion layer 40 is thinned in a range in which a high bonding property can be maintained in terms of thinning the laminate 1.

Specifically, as illustrated in FIGS. 2A and 2B, a total thickness T of the anti-reflection structure 30 and the adhesion layer 40 may preferably be equal to or less than 30 μm, and more preferably be equal to or less than 10 μm.

(Color difference between reflected light by light shielding film and reflected light by anti-reflection structure: ΔE)

According to the laminate 1 of the present disclosure, a color difference (ΔE) between the reflected light by the light shielding film 20 and the reflected light by the anti-reflection structure 30 expressed in the a formula shown below is equal to or less than 1.5.

$$\Delta E = \sqrt{(a_1 - a_2)^2 + (b_1 - b_2)^2}$$ [Mathematical formula 3]

When the color difference (ΔF) between the reflected light by the light shielding film 20 and the reflected light by the anti-reflection structure 30 is equal to or less than 1.5, a reflection chromaticity can be kept neutral between the surface of the anti-reflection structure 30 and its surrounding surface (in FIG. 1, the surface of the light shielding film 20). Thus, when the laminate according to the present disclosure is used for the camera module mounting apparatus, a captured image with reduced color unevenness can be obtained.

In the above formula, $a_1$ and $b_1$ represent a* and b* values of the light reflected by the light shielding film 20 in the CIE1976 (L*a*b*) color system, and $a_2$ and $b_2$ represent a* and b* values of the light reflected by the anti-reflection structure 30 in the CIE1976 (L*a*b*) color system. The CIE1976 (L*a*b*) color system is one of the uniform color spaces defined by CIE in 1976, and a color space using three-dimensional orthogonal coordinates of the lightness index L and the chromaticity indices a* and b* is called an L*a*b* color space, and is a color system using this color space.

Although the ΔE needs to be equal to or less than 1.5, in terms of making the reflection chromaticity of the surface of the anti-reflection structure 30 and its surrounding surface more neutral, it is preferably equal to or less than 1.0, and more preferably equal to or less than 0.7.

The a* value and b* values of the light reflected by the light shielding film 20 in the CIE1976 (L*a*b*) color system and a* value and b* values of the light reflected by the anti-reflection structure 30 in the CIE1976 (L*a*b*) color system can be obtained by using commercially available measuring devices.

The above described a* value and b* value in the CIE1976 (L*a*b*) color system and the color difference ΔE can be adjusted by changing the material, the shape and the thickness of the light shielding film 20, the material of the anti-reflection structure 30, the uneven period P of the uneven structure, the uneven height H of the uneven structure, and the like.

Furthermore, according to the laminate 1 of the present disclosure, the difference (ΔY) between the luminous reflectance (Y value) of the light shielding film 20 and the luminous reflectance (Y value) of the anti-reflection structure 30 is preferably equal to or less than 0.5. This is because, since the brightness on the chromaticity diagram can be set substantially the same condition, the reflection chromaticity between the surface of the anti-reflection structure 30 and its surrounding surface can be maintained more neutral.

Here, the luminous reflectance (Y value) is a reflectance obtained in consideration that the brightness perceived by eyes is changed by the visibility sensitivity, and is (X, Y, Z) when representing the color of the positive reflected light in the CIE1931 XYZ color space, or (x, y, Y) when representing the color of the positive reflected light in the CIE xyY color space. The visual reflectance can be measured with a commercially available spectrometer (e.g., V650, etc., from JASCO Corporation).

It is to be noted that the luminous reflectance and the difference in reflectance of each of the light shielding film and the anti-reflection structure 30 can be adjusted by changing the density or the uneven height of the fine uneven structure, for example.

<Camera Module Mounting Apparatus>

Figure 4:
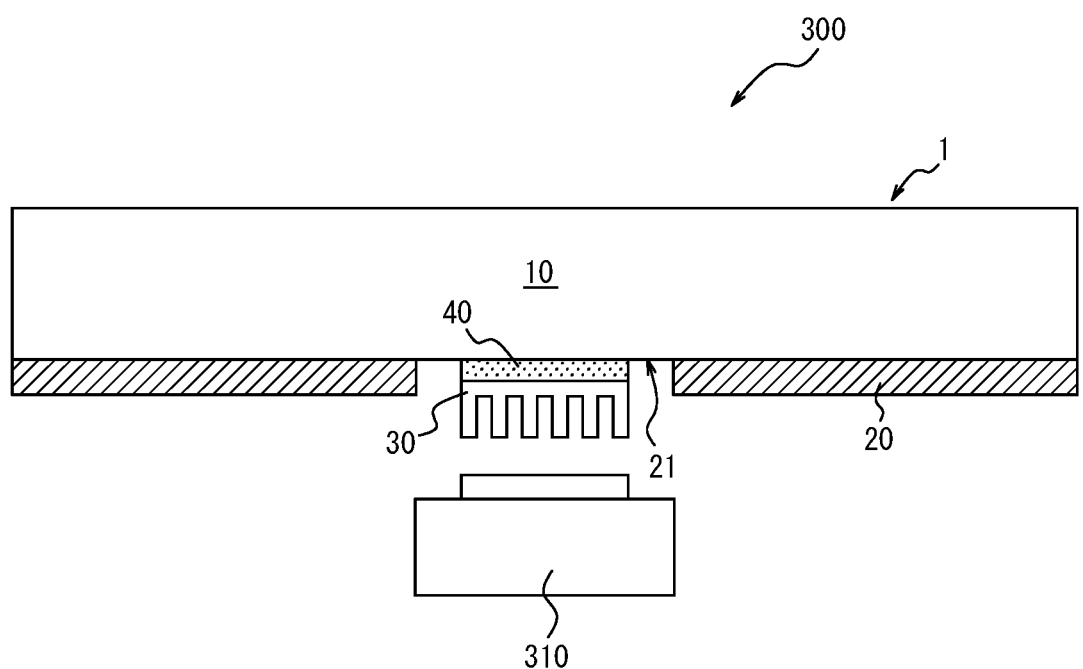
FIG. 4 is a cross-sectional view schematically illustrating a camera module and a laminate according to the embodiment of a camera module mounting apparatus of the present disclosure.

The camera module mounting apparatus 300 according to the present disclosure includes a laminate 1 according to the present disclosure and a camera module 310 provided at a position facing the anti-reflection structure 30 in the laminate, as illustrated in FIG. 4.

According to the camera module mounting apparatus of the present disclosure, a still image or a moving image can be photographed by an image sensor of the camera module through the laminate of the present disclosure, thus reflection of light is suppressed, and occurrence of color unevenness and the like can be suppressed in a captured image obtained.

EXAMPLES

Next, the present disclosure will be explained in more detail on the basis of examples. However, the present disclosure is not limited in any manner to the following examples.

Example 1-1

A model of the laminate 1 including a display plate 10, a light shielding film 20 provided on the display plate 10 and an anti-reflection structure 30 having a fine uneven structure on the surface thereof was produced as illustrated in FIG. 1. For each of the light shielding film 20 and the anti-reflection structure 30, the chromaticity of reflected light (irradiation angle: 5°) was calculated.

Here, the display plate 10 was a glass substrate, and the light shielding film 20 contained carbon black, and was formed by applying a spray paint containing butyl acetate, ethyl acetate, nitrocellulose, diisobutyl ketone, isopropyl alcohol, isobutanol, and the like to the surface of the glass substrate. The anti-reflection structure 30 was formed of "UVX-6366" (ultraviolet curable resins consisting of 1,6-hexanediol diacrylate, tetrahydrofuryl acrylate, and 2,4,6-trimethylbenzoyl diphenyl phosphine oxide) from TOAGO-SEI CO., LTD., and had an uneven period of the fine uneven structure of 150 to 250 nm, an uneven height of 220 nm, a thickness of the base portion without the fine uneven structure of 1000 nm, and a refractive index n=1.520. Moreover, ultraviolet curing resin is used for the adhesion layer 40, and a thickness thereof was 3000 nm. A total thickness of the anti-reflection structure 30 and the adhesion layer 40 was 4220 nm (about 4.2 μm).

Table 1 shows the structure of the antireflection structure, the total thickness (μm) of the anti-reflection structure and the adhesive layer, and the calculation results of the a* value and the b* value ($a_2$ and $b_2$) of the light reflected by the anti-reflection structure in the CIE1976 (L*a*b*) color system and the color difference ΔE between the reflected light by the light shielding film and the reflected light by the anti-reflection structure.

Comparative Example 1-1

In Comparative Example 1-1, a laminate was produced under the same conditions as in Example 1-1 except that, as an anti-reflection technique, an anti-reflection film (Dry-AR direct forming) was formed by alternately laminating four layers in total of $NbO_x$ and $SiO_2$ instead of the anti-reflection structure 30 having a fine uneven structure.

Table 1 shows the antireflection structure, the total thickness (μm) of the anti-reflection structure and the adhesive layer, and the calculation results of the a* value and the b* value of the light reflected by the anti-reflection structure in the CIE1976 (L*a*b*) color system and the color difference ΔE between the reflected light by the light shielding film and the reflected light by the anti-reflection structure.

Comparative Example 1-2

In Comparative Example 1-2, a laminate was produced under the same conditions as in Example 1-1 except that, as an anti-reflection technique, an anti-reflection film (Wet-AR direct coating) was formed by coating a material having a refractive index n=1.340.

Table 1 shows the antireflection structure, the total thickness (μm) of the anti-reflection structure and the adhesive layer, and the calculation results of the a* value and the b* value of the light reflected by the anti-reflection structure in the CIE1976 (L*a*b*) color system and the color difference ΔE between the reflected light by the light shielding film and the reflected light by the anti-reflection structure.

Comparative Example 1-3

In Comparative Example 1-3, a laminate was produced under the same conditions as in Example 1-1 except that, as an anti-reflection technique, an antireflection film (Wet-AR film lamination) was formed by laminating a high refractive index material (refractive index n=1.700) and a low refractive index material (refractive index n=1.250).

Table 1 shows the antireflection structure, the total thickness (μm) of the anti-reflection structure and the adhesive layer, and the calculation results of the a* value and the b* value of the light reflected by the anti-reflection structure in the CIE1976 (L*a*b*) color system and the color difference ΔE between the reflected light by the light shielding film and the reflected light by the anti-reflection structure.

Examples 1-2 to 1-7 and Comparative Examples 1-4 to 1-7

In Examples 1-2 to 1-7 and Comparative Examples 1-4 to 1-7, a laminate was produced under the same conditions as in Example 1-1 except that the uneven height was changed (for specific height of the uneven height, see Table 2) with respect to the fine uneven structure of the anti-reflection structure 30.

Table 3 shows an uneven height (nm) of the anti-reflection structure, the a* value and the b* value of the light reflected by the anti-reflection structure in the CIE1976 (L*a*b*), and the color difference ΔE between the reflected light by the light shielding film and the reflected light by the anti-reflection structure (Dry-AR direct forming).

Example 2

As illustrated in FIG. 1, a laminate 1 including a display plate 10, a light shielding film 20 provided on the display plate 10 and an anti-reflection structure 30 having a fine uneven structure on the surface thereof was actually produced. For each of the light shielding film 20 and the anti-reflection structure 30, the chromaticity of each reflected light (irradiation angle: 5°) was measured.

Here, the display plate 10 was a glass substrate, and the light shielding film 20 contained carbon black, and was formed by applying a spray paint containing butyl acetate, ethyl acetate, nitrocellulose, diisobutyl ketone, isopropyl alcohol, isobutanol, and the like to the surface of the glass substrate. The anti-reflection structure 30 was formed of "UVX-6366" (ultraviolet curable resins consisting of 1,6-hexanediol diacrylate, tetrahydrofuryl acrylate, and 2,4,6-trimethylbenzoyl diphenyl phosphine oxide) from TOAGOSEI CO., LTD., and had an uneven period of the fine uneven structure of 150 to 250 nm, an uneven height of 220 nm, a thickness of the base portion without the fine uneven structure of 1000 nm. Moreover, ultraviolet curing resin is used for the adhesion layer 40, and a thickness thereof was 3780 nm. A total thickness of the anti-reflection structure 30 and the adhesion layer 40 is 5000 nm (5 μm).

Table 2 shows a structure of the antireflection structure, the total thickness (μm) of the anti-reflection structure and the adhesive layer, and the calculation results of the a* value and the b* value of the light reflected by the anti-reflection structure in the CIE1976 (L*a*b*) and the color difference ΔE between the reflected light by the light shielding film and the reflected light by the anti-reflection structure.

(Evaluation)

Each laminate sample obtained by Examples and Comparative Examples was evaluated as follows. Evaluation results are shown in Table 1.

Figure 5:
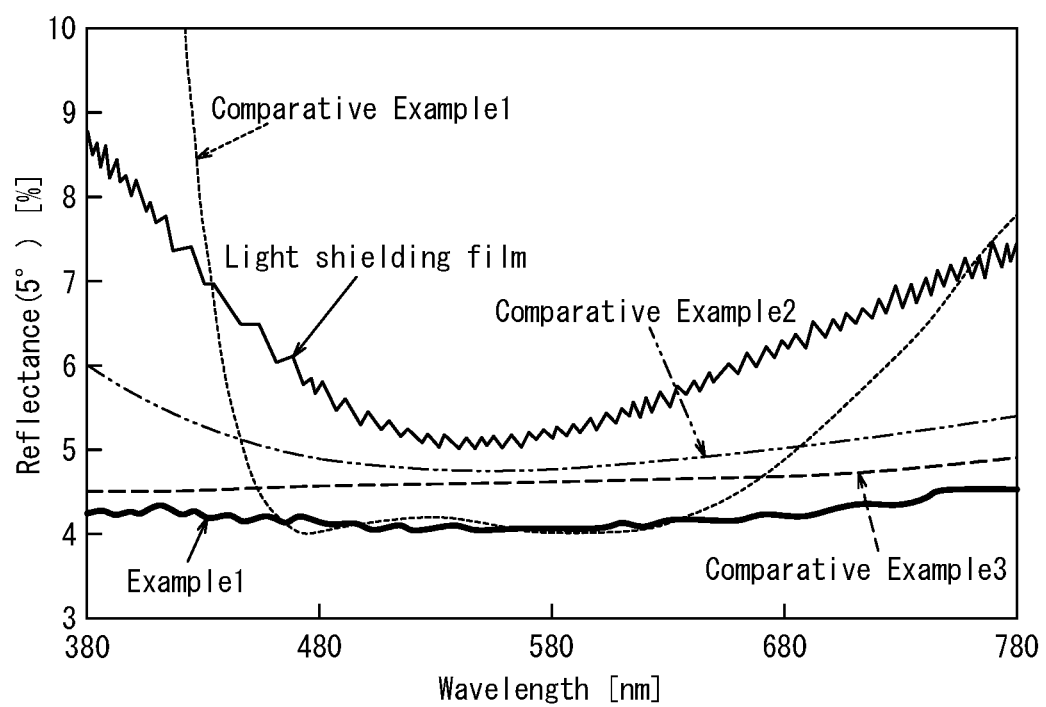
FIG. 5 is a graph illustrating reflectance (%) according to the wavelength of each laminate of Example 1-1 and Comparative Examples 1-1 to 1-4.

(1) Anti-Reflection Performance (a) The spectral wavelength and the reflectance (5°) of each sample of Examples 1-1 and Comparative Examples 1-1 to 1-3 were calculated using the calculation software "TFCalc." The relationship between the wavelength and the reflectance is shown in FIG. 5. For reference, the relationship between the wavelength of the light shielding film portion and the reflectance is also shown in FIG. 5.

From the results of FIG. 5, it was found that the anti-reflection performance of the laminate of Example 1-1 was the best in the wavelength range of 420 to 620 nm.

Figure 6:
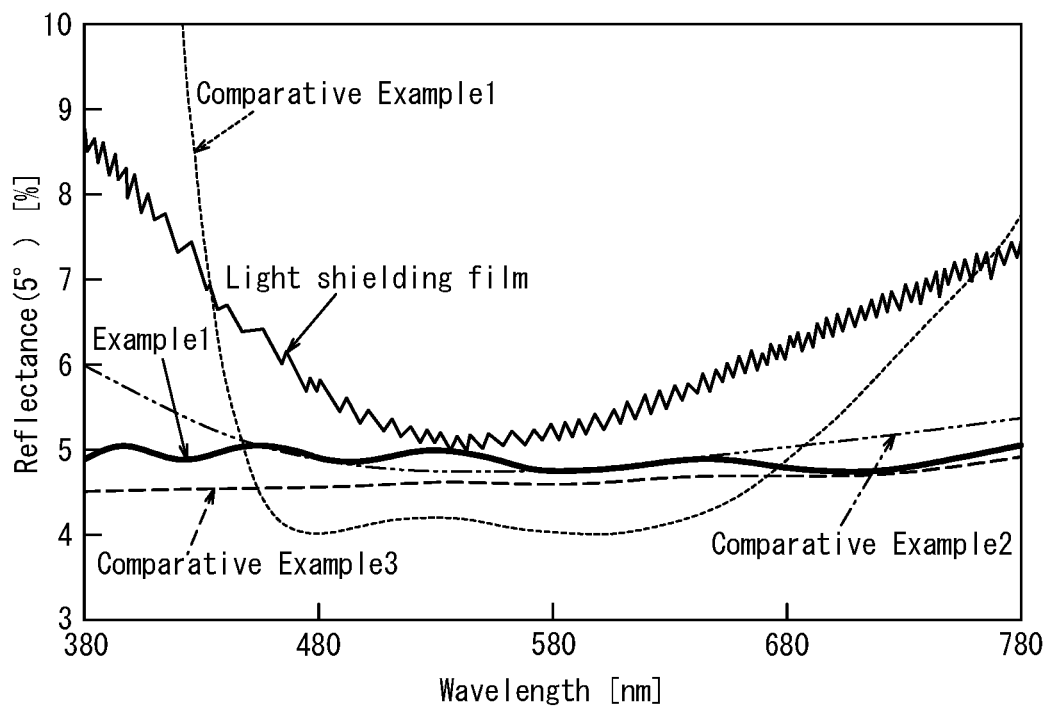
FIG. 6 is a graph illustrating reflectance (%) according to the wavelength of each laminate of Example 2-1 and Comparative Examples 2-1 to 2-4.

(b) The spectral wavelength and the reflectance (5°) of the sample of Example 1-2 were measured by using an ultraviolet visible near-infrared spectrophotometer "V-650" from JASCO Corporation. FIG. 6 shows the relationship between the wavelength and the reflectance. For reference, the relationship between the wavelength and the reflectance of each sample of Comparative Examples 1-1 to 1-3 and the light shielding film portion is also shown in FIG. 6.

From the results of FIG. 6, it was found that the anti-reflection performance of the actually produced laminate of Example 2 was also excellent in the wavelength range of 420 to 660 nm as with Example 1-1.

(2) Neutrality of Reflection Chromaticity (a) The a* value and the b* value of the light reflected by the anti-reflection structure in the CIE1976 (L*a*b*), and the color difference ΔE between the reflected light by the light shielding film and the reflected light by the anti-reflection structure were calculated using the calculation software "TFCalc" with respect to each sample of Example 1-1 and Comparative Examples 1-1 to 1-3. The calculation results are shown in Table 1.

Table 1 shows that the ΔE of Example 1-1 is the smallest, and the reflection chromaticity is kept neutral.

(b) With respect to the sample of Example 2, the optical spectrum was obtained by using an ultraviolet visible near-infrared spectrophotometer "V-650" from JASCO Corporation, and on the basis of that, the a* value and the b* value of the light reflected by the anti-reflection structure in the CIE1976 (L*a*b*) and the color difference ΔE between the reflected light by the light shielding film and the reflected light by the anti-reflection structure were calculated. The measuring results are shown in Table 2.

Table 2 shows that ΔE is kept small, and the reflection chromaticity is kept neutral with respect to Example 2, as with Example 1-1.

(3) Relationship Between Uneven Height of Uneven Structure and ΔE

Figure 7A:
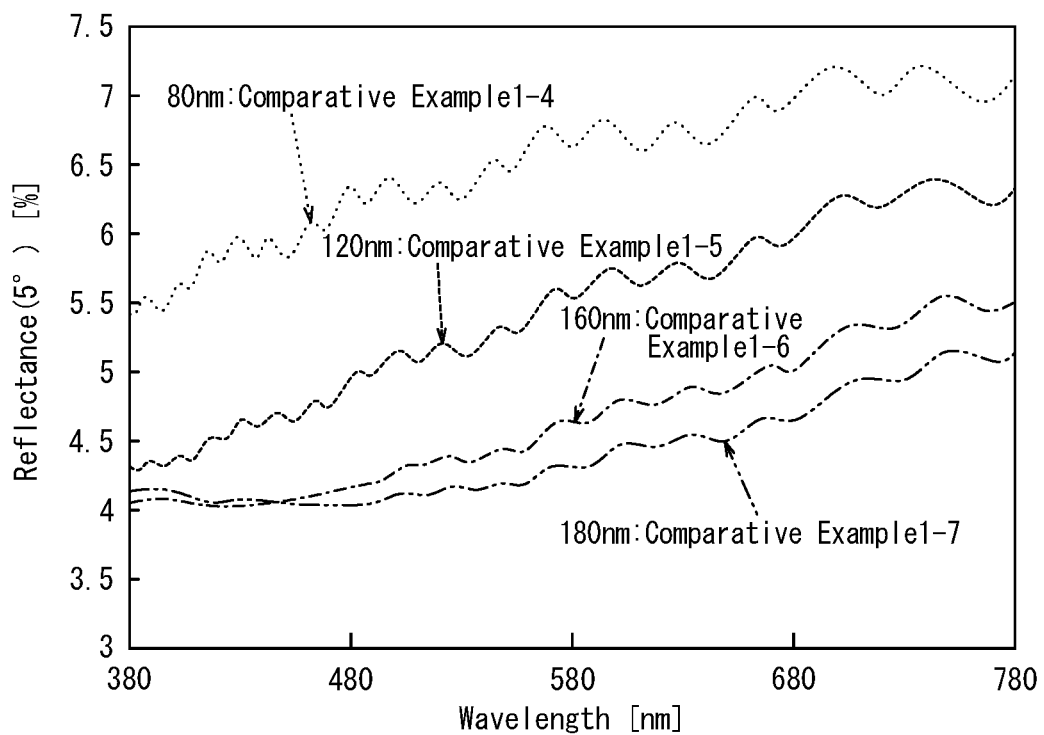
FIG. 7A is a graph illustrating reflectance (%) according to the wavelength of each laminate of Comparative Examples 1-4 to 1-7.
Figure 7B:
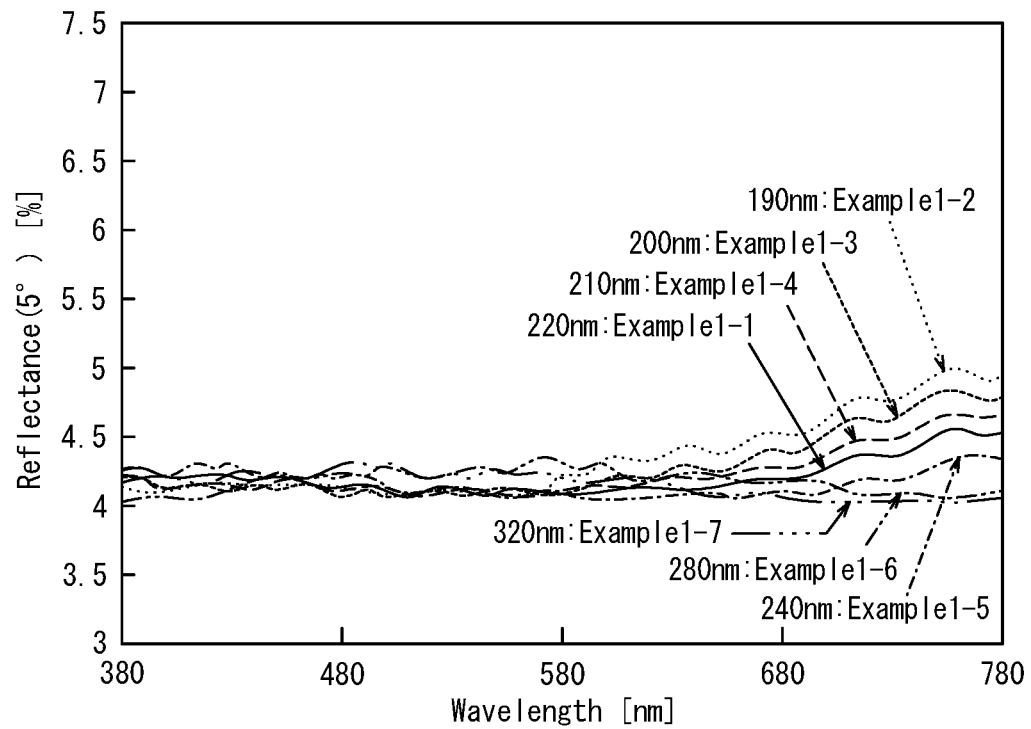
FIG. 7B is a graph illustrating reflectance (%) according to the wavelength of each laminate of Comparative Examples 1-1 to 1-7.

The spectral wavelength and reflectance (5°) of each sample of Examples 1-2 to 1-7 and Comparative Examples 1-4 to 1-7 were calculated using the calculation software "TFCalc," and the relationship between the wavelength and the reflectance is shown in FIGS. 7A and 7B. Furthermore, the a* value and the b* value of the light reflected by the anti-reflection structure in the CIE1976 (L*a*b*), and the color difference ΔE between the reflected light by the light shielding film and the reflected light by the anti-reflection structure were also calculated, and the calculation results are shown in FIG. 3. It is to be noted that, when the color difference ΔE obtained from the calculation was equal to or less than 1.5, which was within a range of the present disclosure, it was evaluated as "pass," and when it exceeded 1.5, it was evaluated as "fail." The evaluation results are shown in Table 3.

FIG. 7 and Table 3 show that, when the uneven height of the uneven structure is equal to or greater than 190 nm, ΔE can be kept within the range of the present disclosure (the determination result is "pass"). Thus an excellent anti-reflection performance could be realized, and reflection chromaticity could be kept neutral.

TABLE 1

|  | Example 1-1 | Comparative Sample 1-1 | Comparative Example 1-2 | Comparative Example 1-3 | Light shielding film (reference) |
|---|---|---|---|---|---|
| Structure of anti-reflection structure | Fine uneven structure | Dry-AR direct forming | Wet-AR direct coating | Wet-AR film lamination | — |
| Total thickness of anti-reflection structure and adhesion layer | 4.2 μm | 0.2 μm | 0.1 μm | 65 μm | — |
| a* value of the light reflected by the anti-reflection structure | 0.43 | 4.22 | 0.98 | 3.56 | −0.1 |
| b* value of the light reflected by the anti-reflection structure | −0.59 | −7.13 | −1.45 | −4.95 | −0.28 |
| Color difference between reflected light by light shielding film and reflected light by anti-reflection structure: ΔE | 0.61 | 8.11 | 1.59 | 5.94 | 0 |
| Determination | Pass | Fail | Fail | Fail | — |

TABLE 2

|  | Example 2 |
|---|---|
| Structure of anti-reflection structure | Fine uneven structure |
| Total thickness of anti-reflection structure and adhesion layer | 5 μm |
| a* value of the light reflected by the anti-reflection structure | −0.33 |
| b* value of the light reflected by the anti-reflection structure | −0.51 |
| Color difference between reflected light by light shielding film and reflected light by anti-reflection structure: ΔE | 0.33 |
| Determination | Pass |

TABLE 3

|  | Comparative Example 1-4 | Comparative Example 1-5 | Comparative Example 1-6 | Comparative Example 1-7 | Example 1-2 | Example 1-3 |
|---|---|---|---|---|---|---|
| Total thickness of anti-reflection structure and adhesion layer | 80 nm | 120 nm | 160 nm | 180 nm | 190 nm | 200 nm |
| Total thickness of anti-reflection structure and adhesion layer | 0.15 | 0.59 | 0.95 | 0.94 | 0.87 | 0.75 |
| a* value of the light reflected by the anti-reflection structure | 2.23 | 3.13 | 2.09 | 1.05 | 0.53 | 0.07 |
| b* value of the light reflected by the anti-reflection structure | 2.51 | 3.47 | 2.59 | 1.69 | 1.26 | 0.92 |
| Color difference between reflected light by light shielding film and reflected light by anti-reflection structure: ΔE | Fail | Fail | Fail | Fail | Pass | Pass |

|  | Example 14 | Example 1-1 | Example 1-5 | Example 1-6 | Example 1-7 |
|---|---|---|---|---|---|
| Total thickness of anti-reflection structure and adhesion layer | 210 nm | 220 nm | 240 nm | 280 nm | 320 nm |
| Total thickness of anti-reflection structure and adhesion layer | 0.6 | 0.43 | 0.05 | −0.48 | −0.39 |
| a* value of the light reflected by the anti-reflection structure | −0.31 | −0.59 | −0.82 | −0.26 | 0.61 |
| b* value of the light reflected by the anti-reflection structure | 0.7 | 0.61 | 0.56 | 0.38 | 0.93 |
| Color difference between reflected light by light shielding film and reflected light by anti-reflection structure: ΔE | Pass | Pass | Pass | Pass | Pass |

INDUSTRIAL APPLICABILITY

According to the present disclosure, a laminate and an anti-reflection structure that can be thinned, are excellent in anti-reflection performance and can keep reflection chromaticity neutral can be provided. Further, according to the present disclosure, a camera module mounting apparatus can be provided, in which thinning is achieved by using the laminate and a captured image with reduced color unevenness can be obtained.

REFERENCE SIGNS LIST

1 Laminate
10 Display plate
20 Light shielding film
21 Non-light shielding portion
30 Anti-reflection structure
40 Adhesion layer
201a First holding film
201b Second holding film
250 Holding film laminate
300 Camera module mounting apparatus
310 Camera module

The invention claimed is:
1. A laminate comprising a display plate having one surface, a light shielding film provided on the one surface of the display plate, and an anti-reflection structure having a fine uneven structure, wherein, the one surface of the display plate is planar, the light shielding film has a hole operating as a non-light shielding portion;

the anti-reflection structure is formed entirely in the non-light shielding portion and has a first surface bonded to the non-light shielding portion through an adhesion layer and a second surface opposed to the first surface, the fine uneven structure is provided at least on the second surface and has an uneven period that is equal to or less than a wavelength of visible light;

the adhesion layer is a layer made of ultraviolet curing adhesive; and a color difference ($\Delta E$) between a reflected light by the light shielding film and a reflected light by the anti-reflection structure expressed in a formula shown below is equal to or less than 1.5, $$\Delta E = \sqrt{(a_1-a_2)^2 + (b_1-b_2)^2}$$

(where $a_1$ and $b_1$ represent a* and b* values of the light reflected by the light shielding film in the CIE1976 (L *a*b*) color system, and $a_2$ and $b_2$ represent a* and b* values of the light reflected by the anti-reflection structure in the CIE1976 (L *a*b*) color system).

2. The laminate according to claim 1, wherein a total thickness of the anti-reflection structure and the adhesion layer is equal to or less than 30 μm.

3. The laminate according to claim 1, wherein an average uneven height of the fine uneven structure is equal to or greater than 190 nm.

4. The laminate according to claim 1, wherein a difference ($\Delta Y$) between a luminous reflectance of the light shielding film and a luminous reflectance of the anti-reflection structure is equal to or less than 0.5.

5. A camera module mounting apparatus, comprising a laminate according to claim 1 and a camera module provided at a position facing an anti-reflection structure in the laminate.

* * * * *